Figure 3:
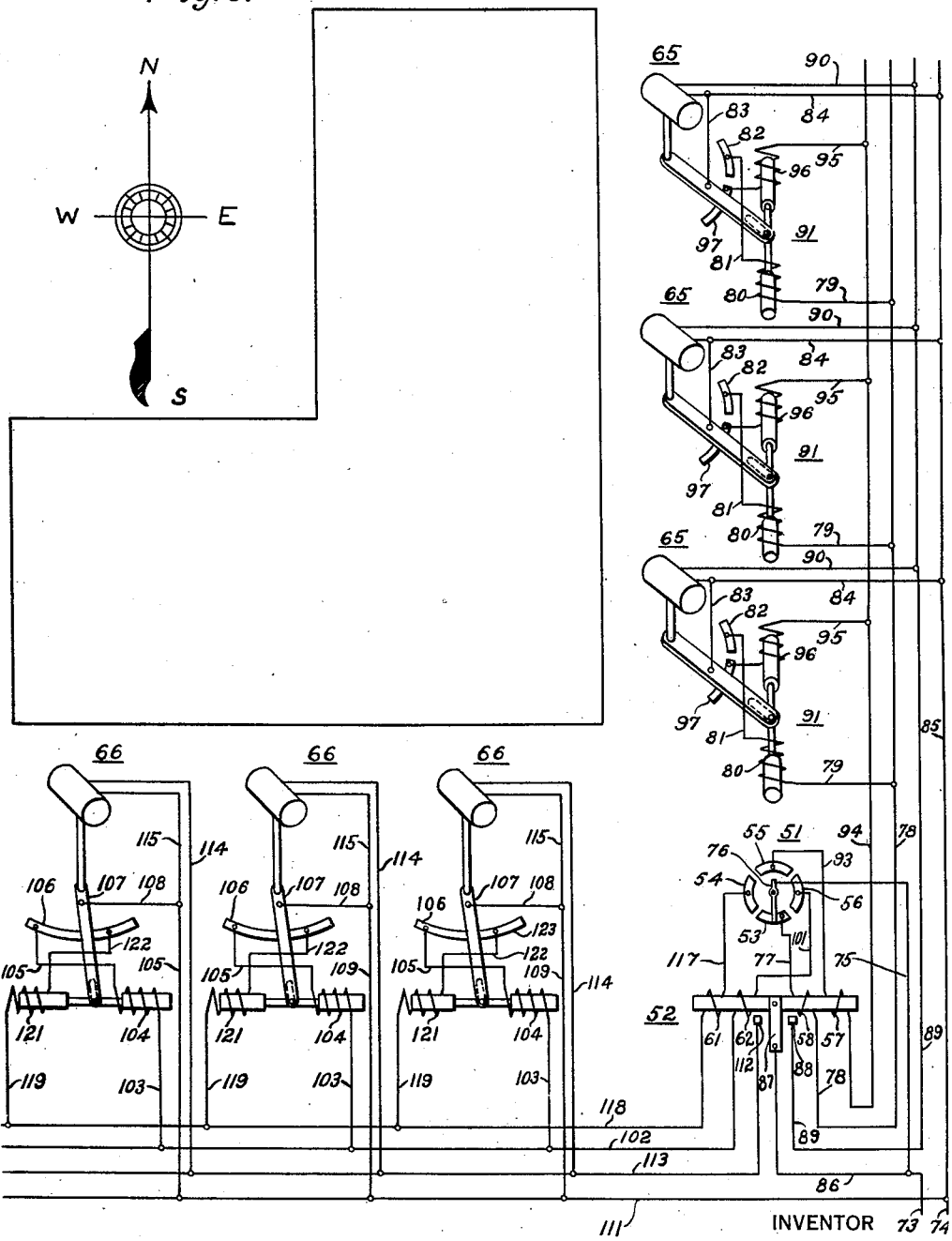

Feb. 10, 1931.  K. A. SIMMON  1,792,251
LIGHTING SYSTEM
Filed April 11, 1929   2 Sheets-Sheet 1
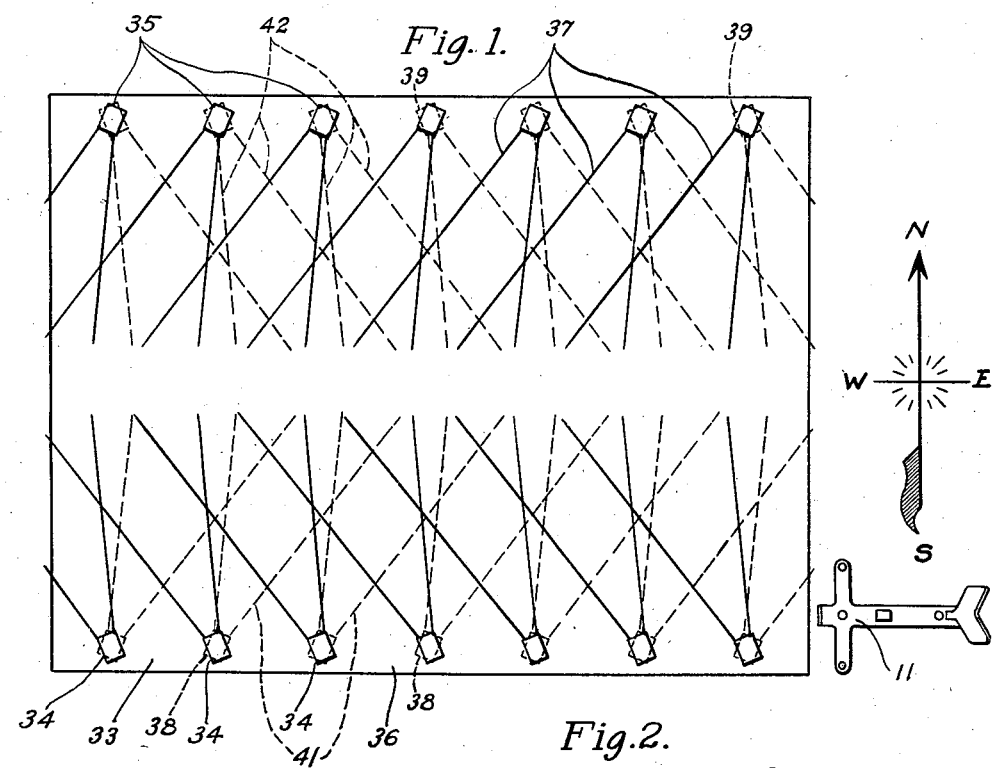
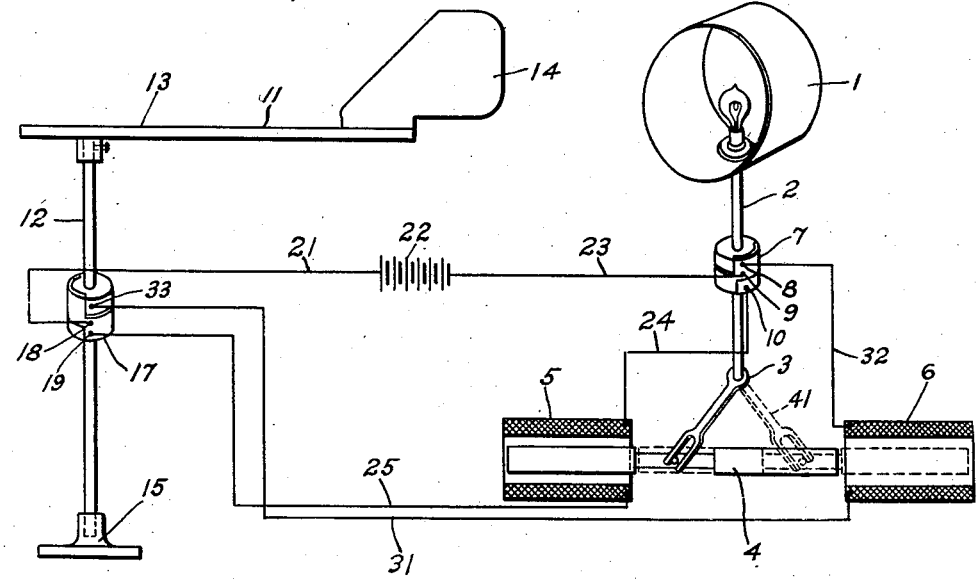
INVENTOR
Karl A. Simmon.
BY
Wesley G. Carr
ATTORNEY Feb. 10, 1931.  K. A. SIMMON  1,792,251

LIGHTING SYSTEM

Filed April 11, 1929  2 Sheets-Sheet 2

INVENTOR
Karl A. Simmon.

BY
Wesley E. Carr
ATTORNEY

Patented Feb. 10, 1931

1,792,251

UNITED STATES PATENT OFFICE

KARL A. SIMMON, OF SAN FRANCISCO, CALIFORNIA

LIGHTING SYSTEM

Application filed April 11, 1929. Serial No. 354,304.

My invention relates to lighting systems and has particular relation to lighting systems involving movably mounted projectors.

It is well known in the art of aviation that it is advisable for an aviator to take off and land against the wind. This is particularly true with the heavier-than-air machines of the present day.

In lighting an airport at night, difficulty has been encountered in that, at times, the aviator is forced to take off and land with the light in his eyes which necessarily involves considerable difficulty and danger.

It is an object of my invention, among others, to obviate this difficulty and provide means for preventing light from shining into the eyes of aviators during the periods when they are taking off and landing.

Another object of my invention is to provide means for indicating the wind direction to an aviator.

A still further object of my invention is to provide a device of the above character which shall be rugged and inexpensive to build, operate and maintain.

Referring to the drawing, in which like figures indicate like parts,

Figure 1 is a schematic view of an airport to which my lighting system is applied, Fig. 2 is a diagrammatic view of the operating parts of a modification of my device, and Fig. 3 is a schematic view of an airport to which another modification of my device is applied.

In practicing my invention, I provide, in connection with an airport landing field, a projector or a group of projectors disposed along one or more sides of a field, the projectors being adapted to be so moved from side to side that the light will shine away from an object on the field, in accordance with the direction of the wind. This is accomplished, in one modification of my invention, by making the projector movable from side to side in accordance with the actuation of the one or the other of a pair of solenoids. The solenoids are controlled by means of suitable contacts mounted to rotate with a wind vane or the like.

Referring more particularly to Fig. 2 of the drawing, a projector 1 is mounted on a rotatable standard 2 in such manner that the projector and standard may be moved from side to side or turned about a vertical axis through an arc of about 90° by means of a crank 3 engaging the shaft 2 and mechanically connected to the plunger 4 of a double solenoid having windings 5 and 6, which are so arranged that, on actuation by the passage of an electric current through the one or the other of the windings, the crank 3 is turned, causing the projector to be moved from one side to the other. A commutator cylinder is so mounted on the shaft 2 that it may rotate therewith, and brushes 8, 9 and 10 are adapted to make electrical connection with portions of the commutator cylinder.

A wind vane 11, comprising a rotatably mounted standard 12, a shaft 13 and tail 14, is supported for turning movement on a base 15. A commutator cylinder 17 is mounted on the shaft 12 to turn with it.

If, for instance, the wind is blowing in such direction that the vane is in the position shown in Fig. 2, a portion of the commutator cylinder 17 is under brushes 18 and 19 to form an electrical path from power supply 22, through conductor 21, brushes 18 and 19, commutator cylinder 17, conductor 25, solenoid 5, conductor 24 and brushes 10 and 9, commutator cylinder 7 and conductor 23, to the source 22, thus energizing the solenoid 5 to cause the plunger 4 to be drawn into the solenoid and thereby actuate crank 3, shaft 2 and projector 1 to cause them to be drawn to the position shown. In this position, the brush 10 no longer makes contact with the commutator cylinder 17 and, therefore, the circuit through the power supply 22 is interrupted, thereby saving the power.

If, through a change of direction of the wind, the vane is caused to move into the sector at 180° from the position shown, a circuit is completed through conductor 21, brush 18, commutator segment 17, brush 33, conductor 31, solenoid 6, conductor 32, brush 8, commutator cylinder 7, brush 9 and conductor 23 to the power supply 22 to cause the plunger 4 to be drawn into the solenoid 6, thereby moving the projector into an alternate position at substantially 90°, as shown by the dotted lines 41. After movement of the projector, brushes 8 and 9 are no longer electrically connected, and current ceases to flow through the actuating circuit.

In applying my invention to an airport 33, such as the one shown diagrammatically in Fig. 1, I provide a plurality of projectors 34 and 35 along one or both sides of the field, preferably in a direction parallel to the prevailing winds. The projectors thereby illuminate a pathway down the middle of the field. If, for instance, the wind is blowing from the west, the vane 11 will assume a position with the tail to the east, thereby causing, as has been explained before, the projectors 34 and 35 to turn to a position such that the light beam is directed away from the eyes of the aviator, as shown in the drawing by the solid lines 36 and 37.

An aviator may then take off and land against the wind without the light from the projectors striking his eyes, inasmuch as the beam spread is such that the light is cut off at an angle substantially perpendicular to the length of the field.

If now the direction of the wind changes to such an extent that it is blowing from the eastern half of the quadrant, the vane will be turned to a position in a half circle opposite the position shown in Fig. 2. This automatically causes the projectors 34 and 35 to be turned from one side to the other, so that they will occupy a position shown by the broken lines 38 and 39 of the diagram, and the light will be projected in beams which are at 90° from their former position, as shown by the broken lines.

By reason of the pattern of the projected beams on the ground, as shown in Fig. 1, the aviator is enabled to know in which direction the wind is blowing and to know which way he should land. A lane is formed down the middle of the field so that, when the aviator lands or takes off, the light is shining away from him.

In Fig. 3 is shown another modification of the invention, in which lighting from two sides of a field is accomplished by selectively lighting the one or the other of two sets of projectors, in accordance with the direction of the wind, and turning the projectors in accordance with the direction from which the wind is blowing.

In Fig. 3, my lighting system is shown as applied to the problem of lighting a landing field of L-shape, such as is met in a great many instances.

This is accomplished by utilizing the projectors and projector-moving solenoid and interlock system hitherto shown and described. In addition, however, I utilize a four-point air-vane-controlled selector switch 51 and a solenoid-operated single-pole double-throw selector switch 52.

The air-vane-controlled selector switch 51 is similar to the switch shown on the air vane in Fig. 2 except that it has four segments 53, 54, 55 and 56. The single-pole double-throw solenoid-actuated switch has two sets of windings for each pole so that energization of the windings 57 or 58 throws the switch to the right, while energization of winding 60 or 61 throws the switch to the left. For purposes of illustration only, the contact sectors on the projector standards have been shown as being located under the lever arm of the standard, it being understood that the operation of these parts is the same as hereinbefore set forth.

In lighting a field of L-shape, such as shown in Fig. 3, in which, for instance, the runways extend in a north and south direction and in an east and west direction, a plurality of projector units 65 are placed along one side of the field, as, for instance, along the east side, and another group of projectors 66 is placed along the south side of the field.

If the wind is blowing either from the east or from the west, it is desirable that the group of units on the south side of the field shall be illuminated and that they shall be turned in the direction from which the wind is blowing. The group of projectors 65 along the east side of the field should not be energized during the time the wind is blowing from the east or from the west but should be energized when the wind is blowing from the north or from the south and should be turned in the direction from which the wind is blowing. The projectors along the south side of the field, of course, should not be energized during the time that the wind is blowing from the north or from the south.

If desired, it might be advisable to energize the projectors at the south side of the field during the time the wind is blowing from the south and, in the same manner, the projectors along the east side of the field might be illuminated when the wind is blowing from the east. This may be accomplished by a slight change in the connections shown in Fig. 3.

The power for operating and energizing the beacons is provided by means of main-line conductors 73 and 74. If the wind is blowing from the north, the air vane will occupy a position such as that shown in Fig. 3, and a circuit is formed through conductor 75, air vane 76, sector 53, conductor 77, coil 58, conductor 78, conductors 79, solenoid coils 80, conductors 81, sectors 82, conductors 83, and conductors 84 and, through conductor 85, to main-line conductor 74.

The closing of this circuit and the consequent energization of coil 58 actuates the solenoid switch 52 to cause a circuit between main-line conductors 73 and 74 to be closed through conductor 86, knife blade 87, contact 88, conductor 89, conductors 90, the lamps in projectors 65 and conductors 84 and 85, thus energizing the lamps in projector 65.

The energization of coils 80 causes the cores of the electromagnets 91 to be drawn into the coils, thereby moving the projectors 65 so that they are directed in a northwesterly direction, i. e., in the general direction from which the wind is blowing.

If the wind were to change and blow from the south, the air vane 76 would assume a position with the tail to the north, and a circuit would be closed through conductor 75, vane 76, sector 55, conductor 93, coil 57, conductor 94, conductors 95, coils 96, sectors 97 and conductors 83, 84 and 85, thereby causing the projectors 65 to be moved so that the light therefrom would be directed in a southerly direction. The energization of coil 57 closes the circuit previously utilized in energizing the lamps in projector 65.

If the wind were to blow from a westerly direction, a circuit would be closed, through conductor 75, vane 76, sector 56, conductor 101, coil 62, conductor 102, conductors 103, coils 104, conductors 105, sectors 106, levers 107, conductors 108, conductors 109 and conductor 111, to main-line conductor 74.

The consequent energization of coil 62 causes the solenoid 52 to be actuated to close a circuit through conductor 86, knife blade 87, contact 112, conductor 113, conductors 114, the lamps in projector 66 and conductors 115, 109, 111 and main-line conductor 74.

The energization of coils 104 causes the lever 107 to be thrown to the right, thus causing the projectors to be directed in a north-westerly direction against the general direction from which the wind is blowing.

In the same manner, if the wind is blowing from the east, a circuit is closed through conductor 75, vane 76, sector 54, conductor 117, coil 61, conductor 118, conductors 119, coils 121, conductors 122, sectors 123, switch arms 107, conductors 108, conductors 109 and conductor 111, thereby causing the projectors to be directed in a north-easterly direction against the direction from which the wind is blowing.

It is apparent that the lighting system just described will not permit light to shine into the eyes of an aviator who is landing and taking off. The pattern of the projected beams on the ground indicates the wind direction and, since only the portion of the field which the aviator is to use is illuminated, the aviator knows at once where and in which direction to take off and land.

Although I have described a specific modification of my invention, it is apparent that my invention is susceptible of considerable modifications and may be utilized in a number of ways. Therefore, modifications may be made by those skilled in the art without departing from the spirit and scope of my invention, as set forth in the appended claims.

I claim as my invention:

1. In a system for lighting an airport, a landing lane, a plurality of projectors at one side of the lane to illuminate said lane at an angle thereto, said projectors being adapted to be moved from side to side and means for moving the projectors from side to side in accordance with the direction of the wind, said means comprising an air vane and electromagnetic actuating means controlled thereby, whereby the light from the projectors never shines directly into the eyes of an aviator utilizing the landing lane for taking off and landing.

2. In a system for lighting an airport, a landing lane, a plurality of projectors at one side of the lane to illuminate said lane at an angle thereto, said projectors being adapted to be moved from side to side and means for moving the projectors from side to side in accordance with the direction of the wind, said means comprising an air vane and a solenoid system controlled thereby, whereby the light from the projectors never shines directly into the eyes of an aviator utilizing the landing lane for taking off and landing.

3. In a lighting system, a projector mounted for movement from side to side, electrically operated actuating means for moving the projector, a control circuit electrically connected to the actuating means, and an interlocking means on the movable part of the projector whereby the electric current ceases to flow through the electrically operated actuating means after the control circuit has been closed and the projector moved from one side to the other.

4. In a lighting system, a projector mounted for movement from side to side, electrically operated actuating means for moving the projector, a control circuit including an air vane electrically connected to the actuating means, and an interlocking means on the movable part of the projector whereby the electric current ceases to flow through the electrically operated actuating means after the control circuit has been closed and the projector moved from one side to the other.

5. In a lighting system, a projector mounted for movement from side to side, electrically operated actuating means for moving the projector, a control circuit including an air vane and a commutator member mounted for rotation with the air vane and brushes adapted to close predetermined circuits of the actuating means in accordance with the direction of the wind, and an interlocking means on the movable part of the projector whereby the electric current ceases to flow through the electrically operated actuating means after the control circuit has been closed and the projector moved from one side to the other.

6. In a lighting system, a plurality of projectors adapted to be moved in unison, a projector mounted for movement from side to side, a commutator member on the moving part of the projector, a pair of solenoids for moving the projector, a wind vane, a commutator member mounted on the wind vane and a control circuit whereby movement of the wind vane and wind vane commutator member into one position closes one portion of the control circuit, thus actuating one of the solenoids to cause the projector to move from one side to the other.

7. In a lighting system, a plurality of projectors adapted to be moved in unison from side to side, commutator members on the moving parts of the projectors, solenoids for moving the projectors, a wind vane, a commutator member mounted on the wind vane and a control circuit whereby movement of the wind vane and wind-vane commutator member into one position closes one portion of the control circuit, thus actuating one of each of the sets of the solenoids to cause the projectors to move in unison from one side to the other.

8. In a lighting system, a plurality of projectors adapted to be moved in unison, a projector mounted for movement from side to side, a commutator member on the moving part of the projector, a pair of solenoids for moving the projector, a wind vane, a commutator member mounted on the wind vane and a control circuit whereby movement of the wind vane and wind-vane commutator member into one position closes one portion of the control circuit, thus actuating one of the solenoids to cause the projector to move from one side to the other and the commutator member on the projector being so disposed that the electrical connection of the first named portion of the control circuit is broken on movement of the projector.

9. In a lighting system, a plurality of projectors adapted to be moved in unison, a projector mounted for movement from side to side, a commutator member on the moving part of the projector, a pair of solenoids for moving the projector, a wind vane, a commutator member mounted on the wind vane and a control circuit whereby movement of the wind vane and wind-vane commutator member into one position closes one portion of the control circuit, thus actuating one of the solenoids to cause the projector to move from one side to the other and the commutator member on the projector being so disposed that the electrical connection of the first named portion of the control circuit is broken and an electrically conducting path partly closed in another portion of the control circuit, whereby, on movement of the air vane to a different position, the other portion of the electrical circuit is closed to cause the projector to move to its original position.

10. In an airport lighting system, a projector and standard mounted for movement from side to side about a vertical axis, a solenoid and an arm on the standard mechanically engaged with the plunger of the solenoid, a wind vane and control means for actuating the solenoid comprising contact sectors disposed on the wind vane.

In testimony whereof, I have hereunto subscribed my name this 18th day of March, 1929.

KARL A. SIMMON.